(12) United States Patent
Huang et al.

(10) Patent No.: US 7,502,235 B2
(45) Date of Patent: Mar. 10, 2009

(54) OUTPUT POWER LIMIT FOR A SWITCHING MODE POWER CONVERTER BY A CURRENT LIMIT SIGNAL HAVING A MULTI-SLOPE WAVEFORM

(75) Inventors: Pei-Lun Huang, Longtan Shiang (TW); Kuang-Ming Chang, Taoyuan County (TW)

(73) Assignee: Richtek Technology Corp., Taoyuan County (TW)

( * ) Notice: Subject to any disclaimer, the term of this patent is extended or adjusted under 35 U.S.C. 154(b) by 0 days.

(21) Appl. No.: 11/892,181

(22) Filed: Aug. 21, 2007

(65) Prior Publication Data

US 2008/0310192 A1      Dec. 18, 2008

(30) Foreign Application Priority Data

Jun. 13, 2007 (TW) .............................. 96121411 A

(51) Int. Cl.
*H02M 3/335* (2006.01)
*H02M 1/12* (2006.01)

(52) U.S. Cl. ...................... 363/21.01; 363/41
(58) Field of Classification Search ............. 363/21.01, 363/21.03, 21.1, 21.12, 21.13, 21.15, 21.18, 363/41

See application file for complete search history.

(56) References Cited

U.S. PATENT DOCUMENTS

| 6,674,656 | B1 * | 1/2004 | Yang et al. ................. 363/21.1 |
| 6,781,357 | B2 * | 8/2004 | Balakrishnan et al. ...... 323/282 |
| 6,879,194 | B1 * | 4/2005 | Caldwell .................... 327/143 |
| 7,230,561 | B2 * | 6/2007 | Lee ............................ 341/172 |

* cited by examiner

*Primary Examiner*—Jessica Han
*Assistant Examiner*—Emily Pham
(74) *Attorney, Agent, or Firm*—Rosenberg, Klein & Lee

(57) ABSTRACT

A current limit signal having a multi-slope waveform is provided for a power converter that has a power switch switched to convert an input voltage to an output voltage, for output power control more preciously. The current flowing through the power switch has a maximum value being a function of a duty cycle of the power switch when the power converter operates at a constant output power condition. The current limit signal is generated according to the function, and is compared with a sensing signal produced from the current flowing through the power switch, so as to turn off the power switch if the sensing signal is not lower than the current limit signal.

7 Claims, 14 Drawing Sheets

OUTPUT POWER LIMIT FOR A SWITCHING MODE POWER CONVERTER BY A CURRENT LIMIT SIGNAL HAVING A MULTI-SLOPE WAVEFORM

FIELD OF THE INVENTION

The present invention is related generally to a power supply and, more particularly, to output power limit for a switching mode power converter.

BACKGROUND OF THE INVENTION

As shown in FIG. 1, a conventional flyback converter 100 comprises a transformer TX having a primary winding Lp connected in serial with a power switch SW between a power input Vin and ground GND, a control circuit 102 to switch the power switch SW to generate a secondary current Is flowing through a secondary winding Ls of the transformer TX so as to charge a capacitor Cout and subsequently generate an output voltage Vout, and an optical coupler 104 composed of light emitting diode D2 and transistor 108 and a compensation network 106 to feed back the output voltage Vout to a feedback pin FB of the control circuit 102 for regulating the output voltage Vout. When the power switch SW is on, the primary winding Lp has a primary current Ip flowing therethrough, and a sensing pin CS of the control circuit 102 receives a voltage Vcs across a resistor Rcs so as to sense the primary current Ip. In the control circuit 102, a waveform generator 110 provides a clock CLK and a sawtooth signal 111 whose DC level is shifted according to the signal from the feedback pin FB, a comparator 112 generates a signal S1 for an OR gate 114 in response to the voltage Vcs and the level-shifted sawtooth signal 111. If the comparison signal S1 transits to high, the OR gate 114 resets a flip-flop 116 and thereby turns off the power switch SW such that the primary current Ip is off. To prevent from excessive output power when overload or short circuit happens, the flyback converter 100 is provided with an output power limiter for limiting the output power of the flyback converter 100. The output power limiter includes a limit signal generator 120 to provide a current limit signal Vcl and a comparator 122 to compare the current limit signal Vcl with the current sense signal Vcs to determine a comparison signal S2. If the current sense signal Vcs is greater than the current limit signal Vcl, the comparison signal S2 will reset the flip-flop 116 so as to turn off the power switch SW.

FIG. 2 graphically illustrates the relation between the output voltage Vout and the output current Iout of the flyback converter 100. If the output current Iout does not reach a constant power limit A, the flyback converter 100 operates in a constant voltage mode so as to maintain a stable output voltage Vout. Once the output current Iout reaches the constant power limit A, the flyback converter 100 will enter into a constant power mode to maintain the output power at a constant value by reducing the output voltage Vout with the increased output current Iout. For simplicity, in case the efficiency is not taken into consideration, the output power Pout shall be equal to the input power Pin as $$Pout=Pin=(1/2) \times Lp \times (Ipk^2 - Ivalley^2) \times fs, \quad [\text{EQ-1}]$$

where Ipk is the peak value of the primary current Ip, Ivalley is the valley value of the primary current Ip, and fs is the switching frequency of the power switch SW. As shown by the equation EQ-1, the peak value Ipk and the valley value Ivalley of the primary current Ip will influence the output power Pout.

FIG. 3 illustrates a traditional method for output power limit for a power converter, in which waveforms 124 and 126 represent the current sense signal Vcs and current limit signal Vcl respectively, and the dot line represents the total magnetic current of the transformer TX. In this scheme, the current limit signal Vcl is constant as shown by the waveform 126, and when the current sense signal Vcs increases to reach the current limit signal Vcl, indicating that the primary current Ip is so large that the output power Pout reaches the upper threshold, the control circuit 102 will turn off the power switch SW to limit the output power Pout. However, there is always a certain delay time Tp between the time that the current sense signal Vcs reaches the current limit signal Vcl and the time that the power switch SW is turned off. Such delay time Tp primarily results from propagation delay caused by logic delay and gate driver delay. During this delay time Tp, since the primary current Ip is still on, the current sense signal Vcs will keep increasing until the power switch SW is turned off. Generally, the delay time Tp is very short and therefore the effect it causes is not obvious when the flyback converter 100 operates with low frequency. However, the effect caused by the delay time Tp becomes more obvious when the operation frequency of the flyback converter 100 increases.

Since the delay time Tp primarily results form logic delay and gate driver delay, it will be approximately constant if identical power switch SW is used. When the flyback converter 100 is regulated, the excess output power Pout is eliminated by the feedback compensation. However, in some particular situations, such as overload, a constant current limit signal Vcl will lead to diverse values of the output power Pout and subsequently generate diverse values of the output voltage Vout. FIG. 4 illustrates the current sense signals Vcs generated under different input voltages Vin, in which waveform 128 represents the current limit signal Vcl, waveform 130 represents the current sense signal Vcs under a low input voltage Vin, and waveform 132 represents the current sense signal Vcs under a high input voltage Vin. When the input voltage Vin is relatively low, the increasing speed of the primary current Ip is lower, and thereby the increasing speed of the current sense signal Vcs is lower correspondingly, as shown by the waveform 130. When the input voltage Vin is higher, the increasing speed of the primary current Ip is higher, and thereby the increasing speed of the current sense signal Vcs is higher correspondingly, as shown by the waveform 132. Thus, under a constant delay time Tp, a high input voltage Vin causes a higher peak value Ipk of the primary current Ip, and according to the equation EQ-1, the higher peak value Ipk will generate a higher output power Pout. As shown in FIG. 4, if the current limit signal Vcl is constant, different input voltages Vin will generate different peak values Ipk and thus, a flyback converter cannot provide a constant output power Pout.

To remedy the problem that different input voltage Vin generate different output power Pout, a proposed method senses the input voltage Vin to modify the current limit signal Vcl. However, such strategy requires an additional sense circuit to sense the input voltage Vin. U.S. Pat. No. 6,674,656 to Yang et al. proposed a PWM controller having a saw-limiter for output power limit without sensing input voltage. FIG. 5 illustrates this method, in which waveform 134 represents the current limit signal Vcl, waveform 136 represents the current sense signal Vcs under a low input voltage, and waveform 138 represents the current sense signal Vcs under a high input voltage. A sawtooth waveform is used to generate a linear current limit signal Vcl as shown by the waveform 134 and thus, the current sense signal Vcs generated by a lower input voltage will have a higher current limit level as shown by the waveform 136, and the current sense signal Vcs generated by a higher input voltage will have a lower current limit level as shown by the waveform 138. Thereupon, a same peak value can be achieved and the output power is somehow stabilized. However, the relation between the current limit signal Vcl and the input voltage Vin is not exactly linear and therefore the Yang method only achieves a rough constant output power limit.

SUMMARY OF THE INVENTION

An object of the present invention is to provide an apparatus and method for output power limit for a switching mode power converter.

According to the present invention, a more precious current limit waveform is used to make the output power of a power converter constant. In particular, a current limit signal having a multi-slope waveform is generated and compared with a sensing signal produced from the switched current flowing through a power switch, so as to turn off the power switch if the sensing signal is not lower than the current limit signal. In the case of constant output power regulation, the maximum value of the switched current is a function of the duty cycle of the power switch. The current limit signal is determined according to the function so as to achieve constant output power control more preciously.

BRIEF DESCRIPTION OF THE DRAWINGS

The present invention can be more fully understood by reading the subsequent detailed description and examples with references made to the accompanying drawings; wherein.

DETAIL DESCRIPTION OF THE INVENTION

Figure 4:
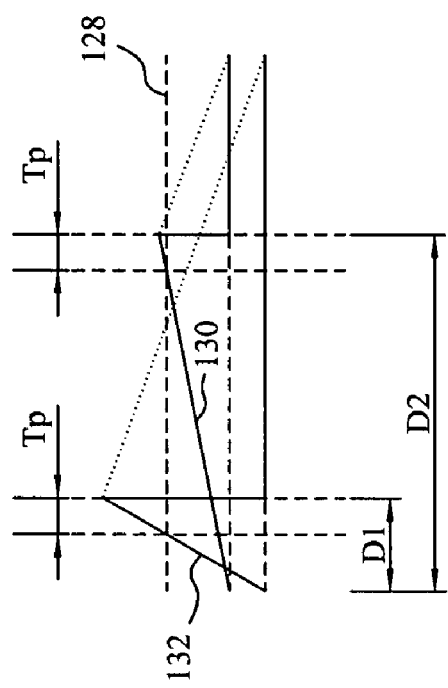
FIG. 4 illustrates the current sense signals Vcs generated under different input voltages.

From the waveforms 130 and 132 shown in FIG. 4, the power switch SW may have diverse duty cycles D1 and D2 under different input voltages Vin. If the current limit signal Vcl varies with time so as to compensate for the variation of the delay time Tp, constant output power limit can be achieved without additional sense circuit to sense the input voltage.

Figure 1:
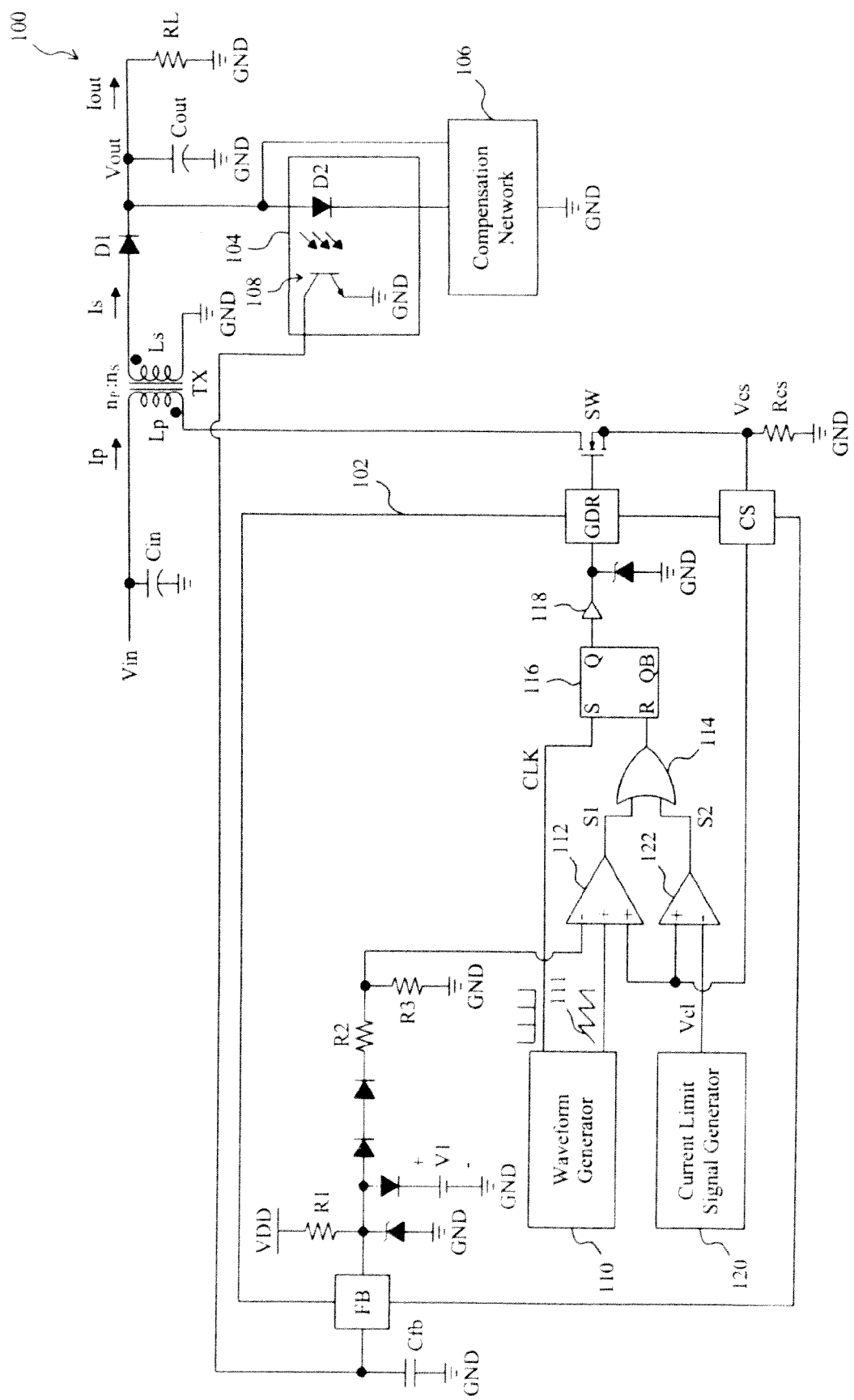
FIG. 1 shows a conventional flyback converter.
Figure 3:
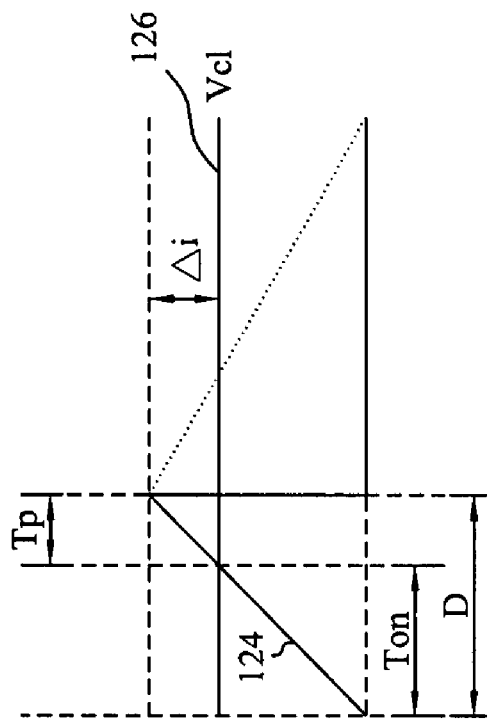
FIG. 3 illustrates a traditional method for output power limit for a power converter.
Figure 2:
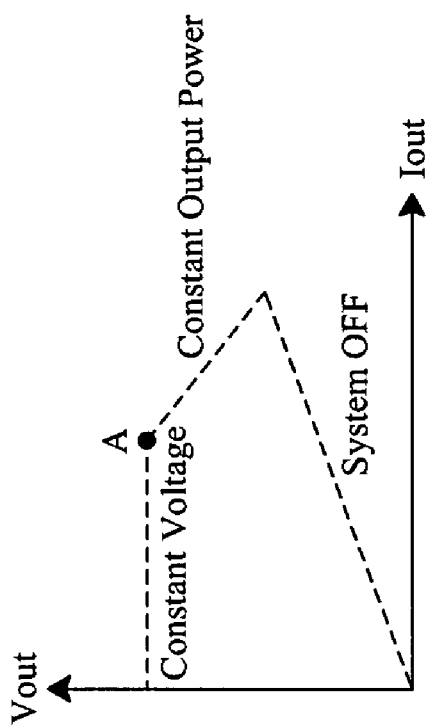
FIG. 2 graphically illustrates the relation between the output voltage and the output current of the flyback converter shown in FIG. 1.
Figure 5:
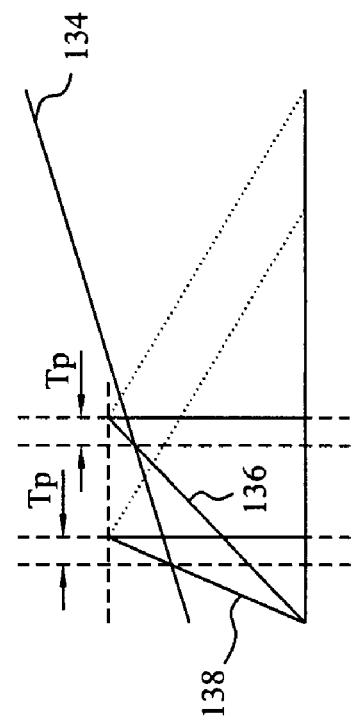
FIG. 5 illustrates a method using a linear current limit signal to limit the current sense signal Vcs.

Referring to FIGS. 1 and 3, those skilled in the art can realize the primary current Ip has a variation during the delay time Tp $$\Delta i = Vin \times Tp/Lp, \qquad [EQ\text{-}2]$$

the peak value $$Ipk = (Vcl/Rcs) + \Delta i, \qquad [EQ\text{-}3]$$

and the valley value $$Ivalley = (Vcl/Rcs) - (Vin \times Ton/Lp), \qquad [EQ\text{-}4]$$

where Ton is the duration of the current sense signal Vcs increasing to reach the current limit signal Vcl. Further, according to volt-second balance principle, it can be derived $$Vin \times (Ton+Tp) = [(Vout+Vf)/n] \times [T-(Ton+Tp)], \qquad [EQ\text{-}5]$$

where Vf is the forward voltage of the diode D1, n is the turns ratio of the primary winding Lp to the secondary winding Ls, and T is the switching period of the power switch SW. Hence, it can be derived $$Ton = T/\{[n \times Vin/(Vout+Vf)]+1\} - Tp. \qquad [EQ\text{-}6]$$

Figure 6:
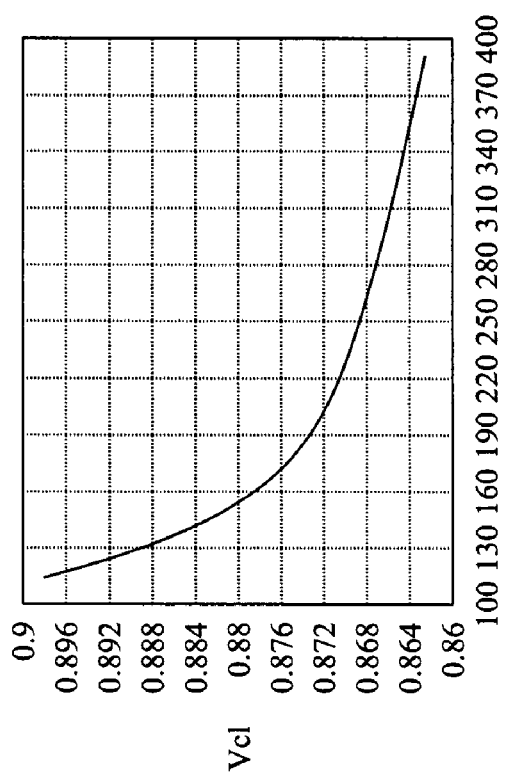
FIG. 6 pictures a relation between the input voltage and the current limit signal of a power converter.

If the output power Pout, the primary winding Lp, the turns ratio n, the forward voltage Vf, the switching period T, the delay time Tp and the resistor Rcd are all constant, according to the equations EQ-1 to EQ-4 and EQ-6, the relation between the input voltage Vin and the current limit signal Vcl can be obtained as shown in FIG. 6, which shows that the current limit signal Vcl is a function of the input voltage Vin.

Figure 7:
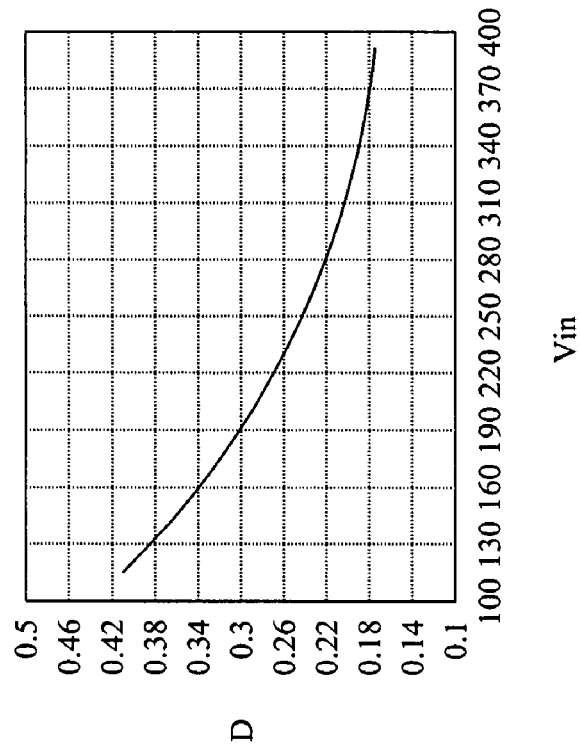
FIG. 7 pictures a relation between the input voltage and the duty cycle of a power converter.
Figure 8:
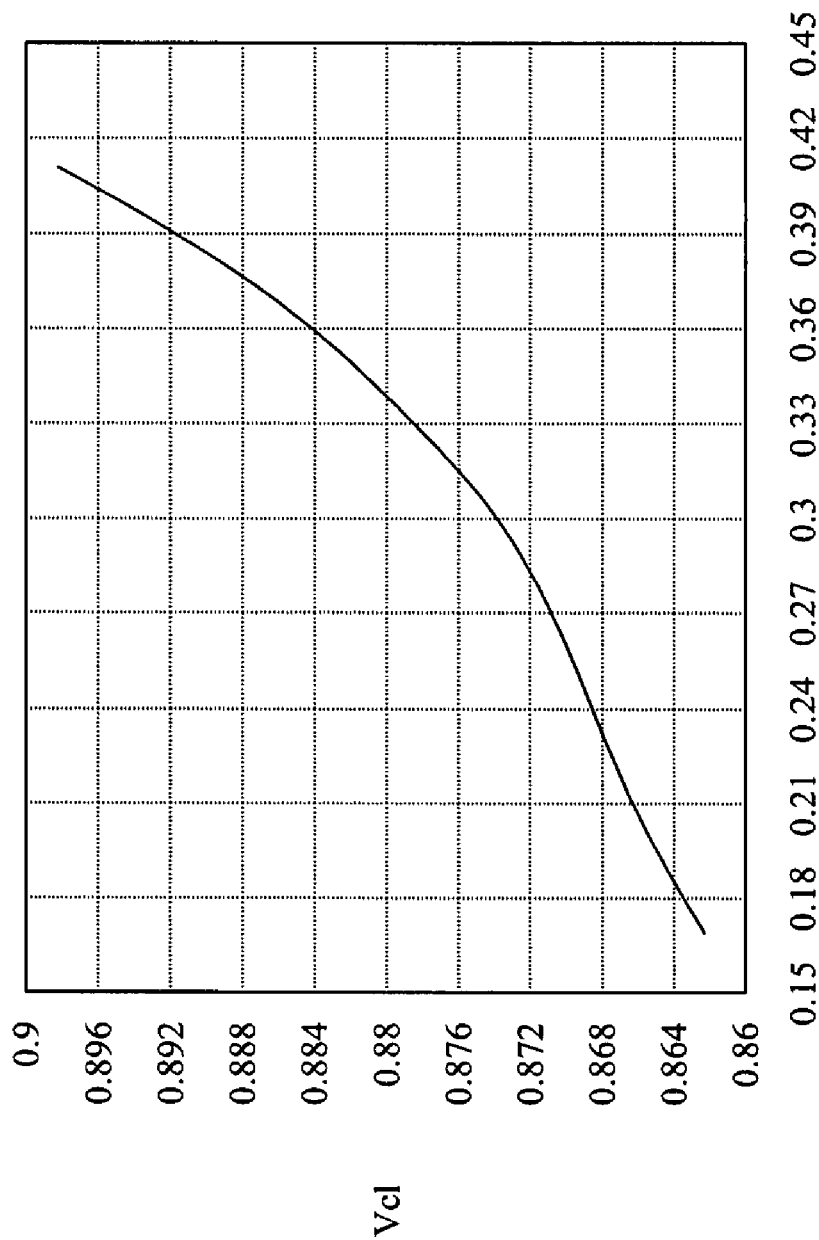
FIG. 8 pictures a relation between the duty cycle and the current limit signal of a power converter.

For the current limit signal Vcl varying with time, the equation EQ-6 is rewritten as $$D = (Ton+Tp)/T = 1/\{[n \times Vin/(Vout+Vf)]+1\}, \qquad [EQ\text{-}7]$$

where D is the duty cycle of the power switch SW. According to the equation EQ-7, FIG. 7 pictures the relation between the input voltage Vin and the duty cycle D. In FIG. 7, the typical range for the input voltage Vin in the art is shown, and the corresponding range of the duty cycle D is between approximately 0.18 and approximately 0.42. According to the equations EQ-2 to EQ-4, EQ-6 and EQ-7, FIG. 8 pictures the relation between the duty cycle D and the current limit signal Vcl. Since the curve shown in FIG. 8 is derived from constant output power, the constant output power control may be implemented with the current limit signal Vcl having the curve shown in FIG. 8. Further, from FIG. 8, it is shown that the current limit signal Vcl is a function of the duty cycle D and is independent on the input voltage Vin, no additional circuit is required for sensing the input voltage Vin for constant output power control.

Figure 9:
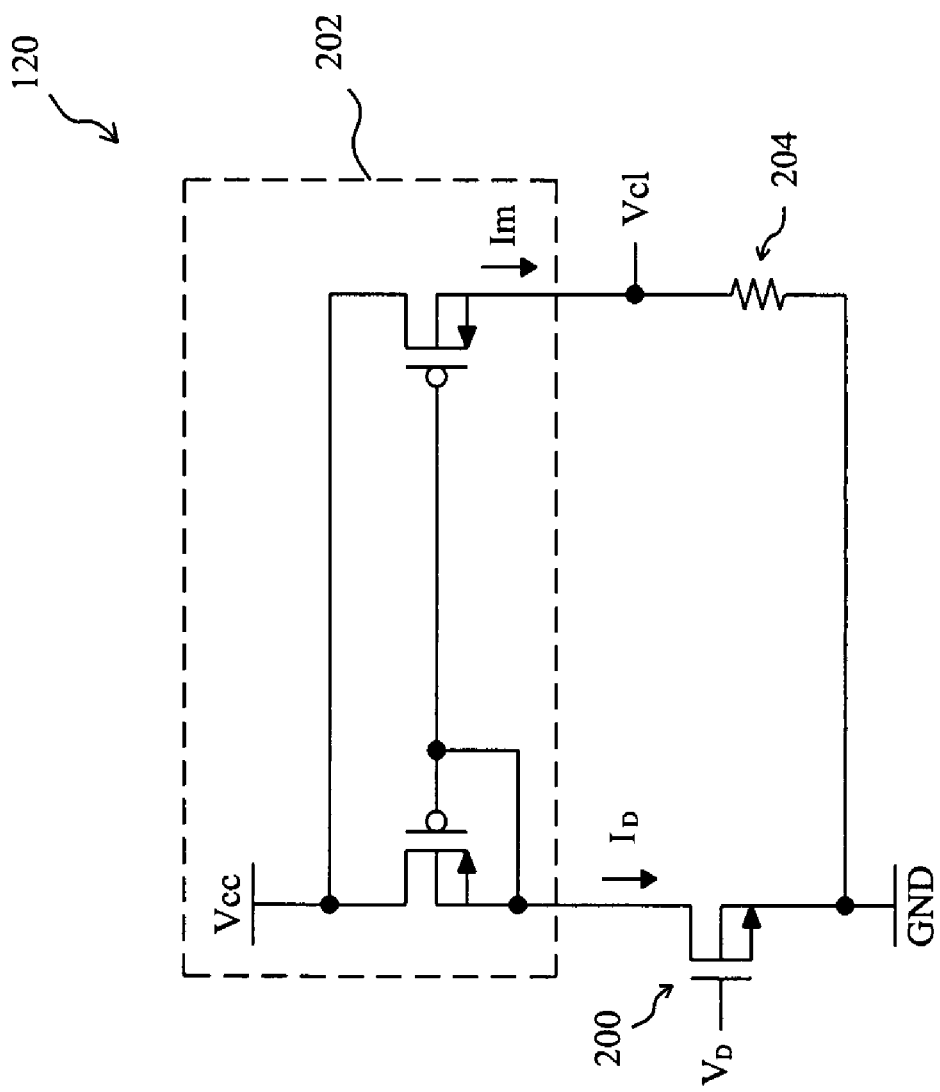
FIG. 9 shows a first embodiment for the current limit signal generator of FIG. 1.

There may be many ways to implement the curve shown in FIG. 8, and some embodiments are provided herein. FIG. 9 shows a first embodiment for the current limit signal generator 120 of FIG. 1, in which a transistor 200 serves as a voltage-controlled current source to generate a current $I_D$ dependent on a voltage $V_D$, a current mirror 202 mirrors the current $I_D$ to generate a mirror current $I_M$ that flows through a resistor 204 to generate the current limit signal Vcl. The voltage $V_D$ is proportional to the duty cycle D, and the current limit signal Vcl will behave as the curve shown in FIG. 8.

Figure 10:
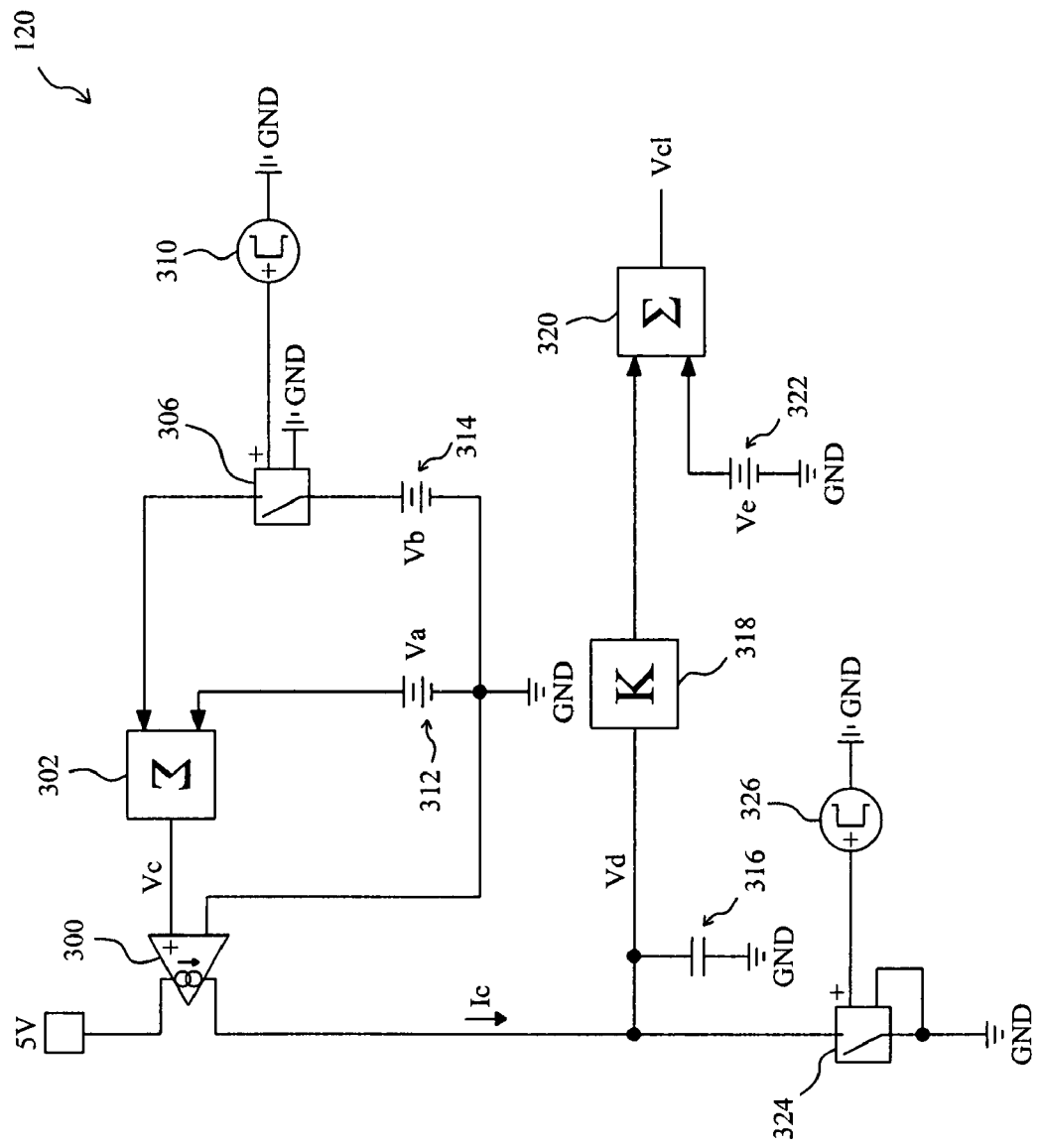
FIG. 10 shows a second embodiment for the current limit signal generator of FIG. 1.
Figure 11:
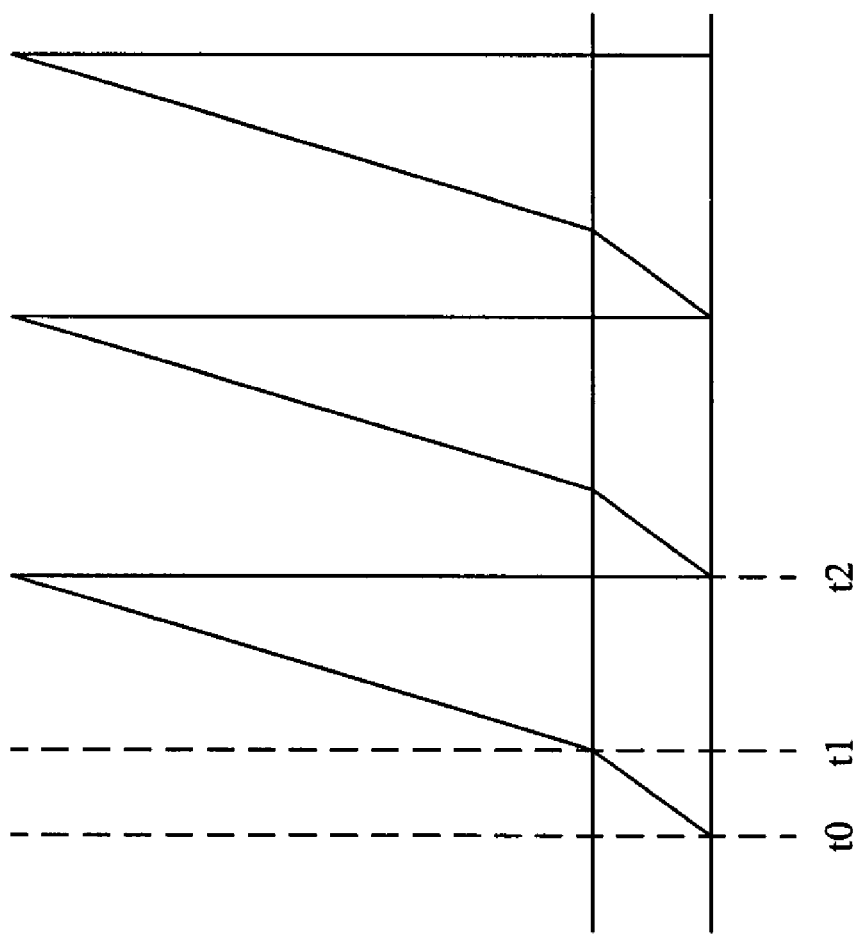
FIG. 11 shows the waveform of a current limit signal generated by the current limit signal generator of FIG. 10.
Figure 12:
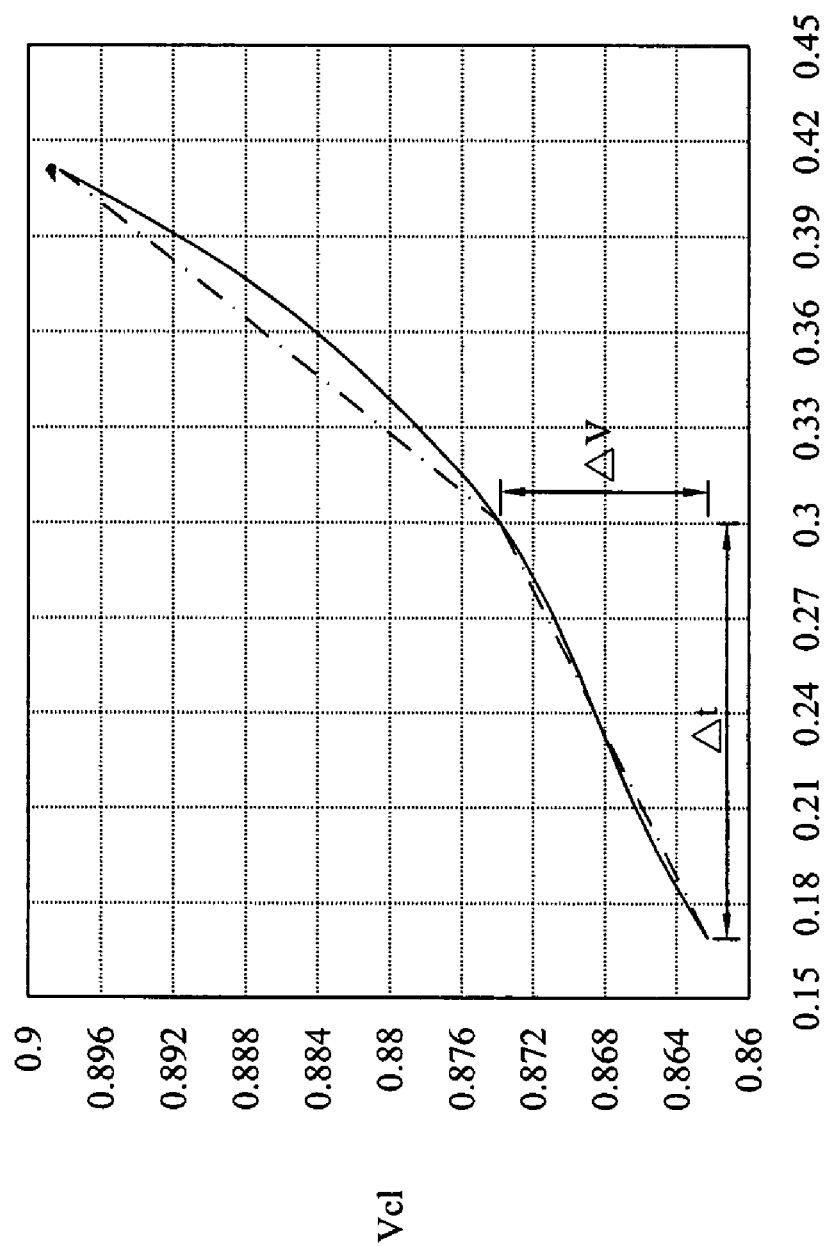
FIG. 12 shows an embodiment for determination of the voltages Va and Vb of FIG. 10.

FIG. 10 shows a second embodiment for the current limit signal generator 120 of FIG. 1, in which voltage sources 312 and 314 provide voltages Va and Vb, respectively, a switch 306 is connected between an adder 302 and the voltage source 314, a signal generator 310 provides a signal to switch the switch 306, the adder 302 combines the voltages on its inputs to generate a voltage Vc, a voltage-to-current converter 300 converts the voltage Vc to a current Ic to charge a capacitor 316 so as to generate a voltage Vd, the voltage Vd is supplied to the adder 320 through a gain circuit 318 to be combined with a DC shift voltage Ve so as to generate the current limit signal Vcl, a switch 324 is connected between the capacitor 316 and ground GND, and a signal generator 326 provides a signal to switch the switch 324 so as to discharge the capacitor 316. FIG. 11 shows the waveform of a current limit signal Vcl generated by the current limit signal generator 120 of FIG. 10. During the time period of t0-t1, the switch 306 is turned off, and thus Vc=Va. The capacitor 316 is charged by the current Ic and the voltage Vd increases. At time t1, the signal generator 310 turns on the switch 306, and thus Vc=Va+Vb. Since the current Ic increases in response to the increase of the voltage Vc, the charging speed of the capacitor 316 is higher and therefore the rising slope of the current limit signal Vcl increases accordingly. At time t2, the signal generator 310 turns off the switch 306, and the signal generator 326 turns on the switch 324 to discharge the capacitor 316. After the discharge of the capacitor 316 is completed, the above steps are repeated again. The voltages Va and Vb are determined according to the function of the current limit signal Vcl and the duty cycle D shown in FIG. 8. FIG. 12 provides an embodiment for determination of the voltages Va and Vb, in which solid line represents the ideal current limit signal Vcl as shown in FIG. 8 and dashed line represents the current limit signal Vcl generated by the current limit signal generator 120 shown in FIG. 10. As shown in FIG. 12, at the position where the duty cycle D is 0.3, the current limit signal Vcl produced by the current limit signal generator 120 changes from a first slope to a second slope. Thus, the charging time $\Delta t$ and the variation $\Delta V$ of the voltage Vd on the capacitor 316 during the time period corresponding to the first slope can be figured out as $$C \times \Delta V = Ic \times \Delta t, \quad [\text{EQ-8}]$$

where C is the capacitance of the capacitor 316 and is a preset parameter. Thereby, the charging current Ic required for generating the first slope can be obtained and then the voltage Va required can be derived therefrom. Similarly, the voltage Vb required for the second slope can be derived in the same way.

Figure 13:
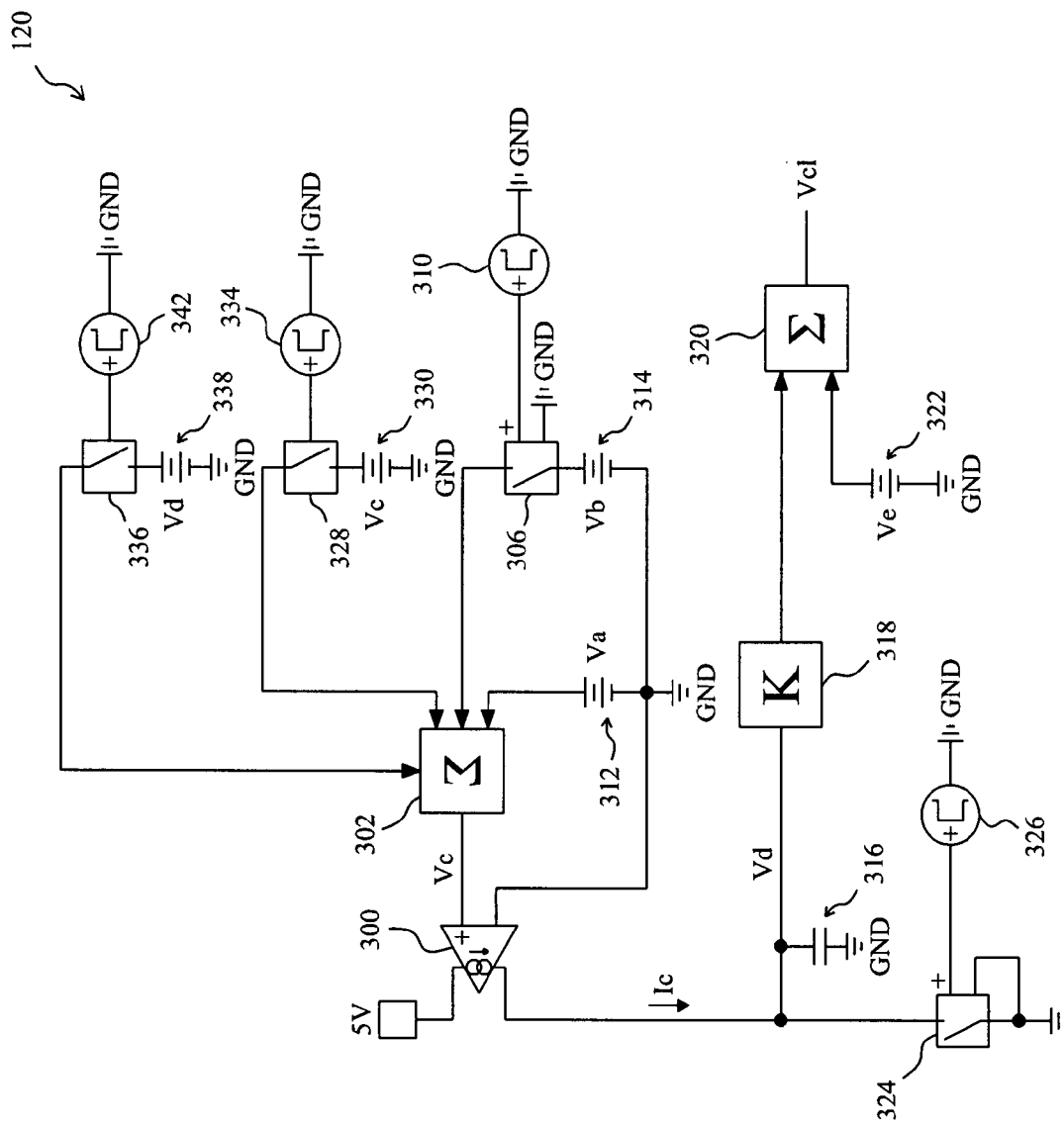
FIG. 13 shows a third embodiment for the current limit signal generator of FIG. 1.

In the current limit signal generator 120 of FIG. 10, the current limit signal Vcl is made with a dual-slope approximating the curve shown in FIG. 8 by switching the switch 306. However, in alternative embodiments, more voltage sources and switches may be connected to the adder 302 to implement the current limit signal Vcl to have more slopes so that the real curve is closer to that shown in FIG. 8. As shown in FIG. 13, switches 328 and 336, voltage sources 330 and 338, as well as signal generators 334 and 342 are added to implement the current limit signal Vcl having a quad-slope waveform.

Figure 14:
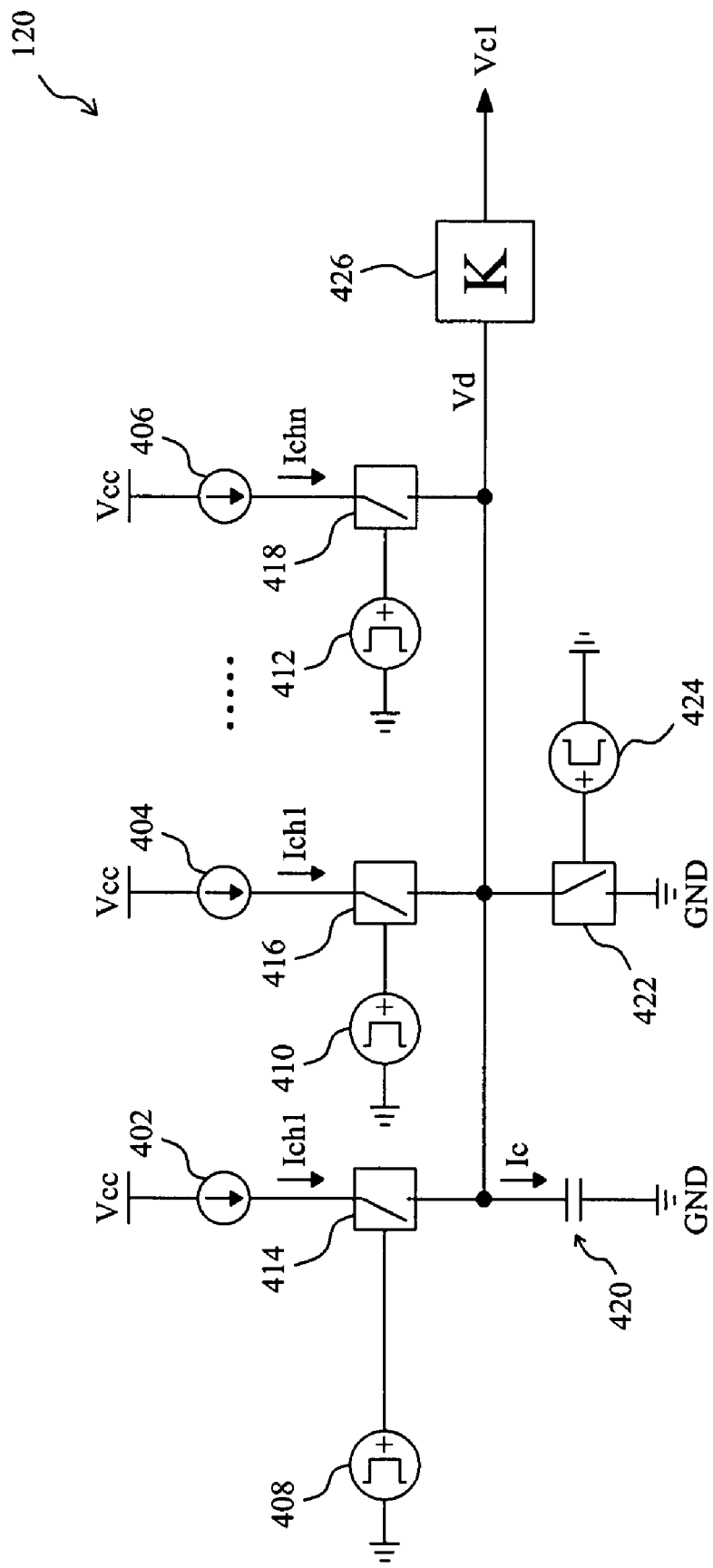
FIG. 14 shows a fourth embodiment for the current limit signal generator of FIG. 1.

FIG. 14 shows a fourth embodiment for the current limit signal generator 120, in which current sources 402, 404 and 406 are connected to a capacitor 420 through switches 414, 416 and 418, respectively, signal generators 408, 410 and 412 switch the switches 414, 416 and 418, respectively, a signal generator 424 switches a switch 422 to discharge the capacitor 420, the capacitor 420 is charged by a variable charging current Ic to generate a voltage Vd, and the voltage Vd is amplified by a gain circuit 426 to generate a current limit signal Vcl. In this embodiment, the switch 414 is first turned on, thereby Ic=Ich1, and the current limit signal Vcl increases with the first slope corresponding thereto. After a period of time, the switch 416 is turned on, thereby Ic=Ich1+Ich2, and the increased current Ic increases the charging speed of the capacitor 420, so that the slope of the current limit signal Vcl becomes steeper. With the increase of the current to charge the capacitor 420 by turning on more switches in the same way, the current limit signal Vcl has a multi-slope waveform. The currents Ich1-Ichn are determined in piecewise manner according to the curve shown in FIG. 8.

To demonstrate the accuracy of power limit of a converter according to the present invention, simulation data are provided with the flyback converter 100 having the parameters:
Output Power Pout=15.667 W,
Inductance of Primary Winding Lp=1500 μH,
Output Voltage Vout=5V,
Input Voltage Vin=110-380V,
Forward Voltage Vf (Diode D1)=0.4V,
Delay Time Tp=100 ns,
Resistor Rcs=1.6Ω,
Switching Period T (Power Switch SW)=14.925 μs,
Switching Frequency Fsw (Power Switch SW)=67 KHz,
Turns Ratio n (Lp/Ls)=0.069.

Figure 15:
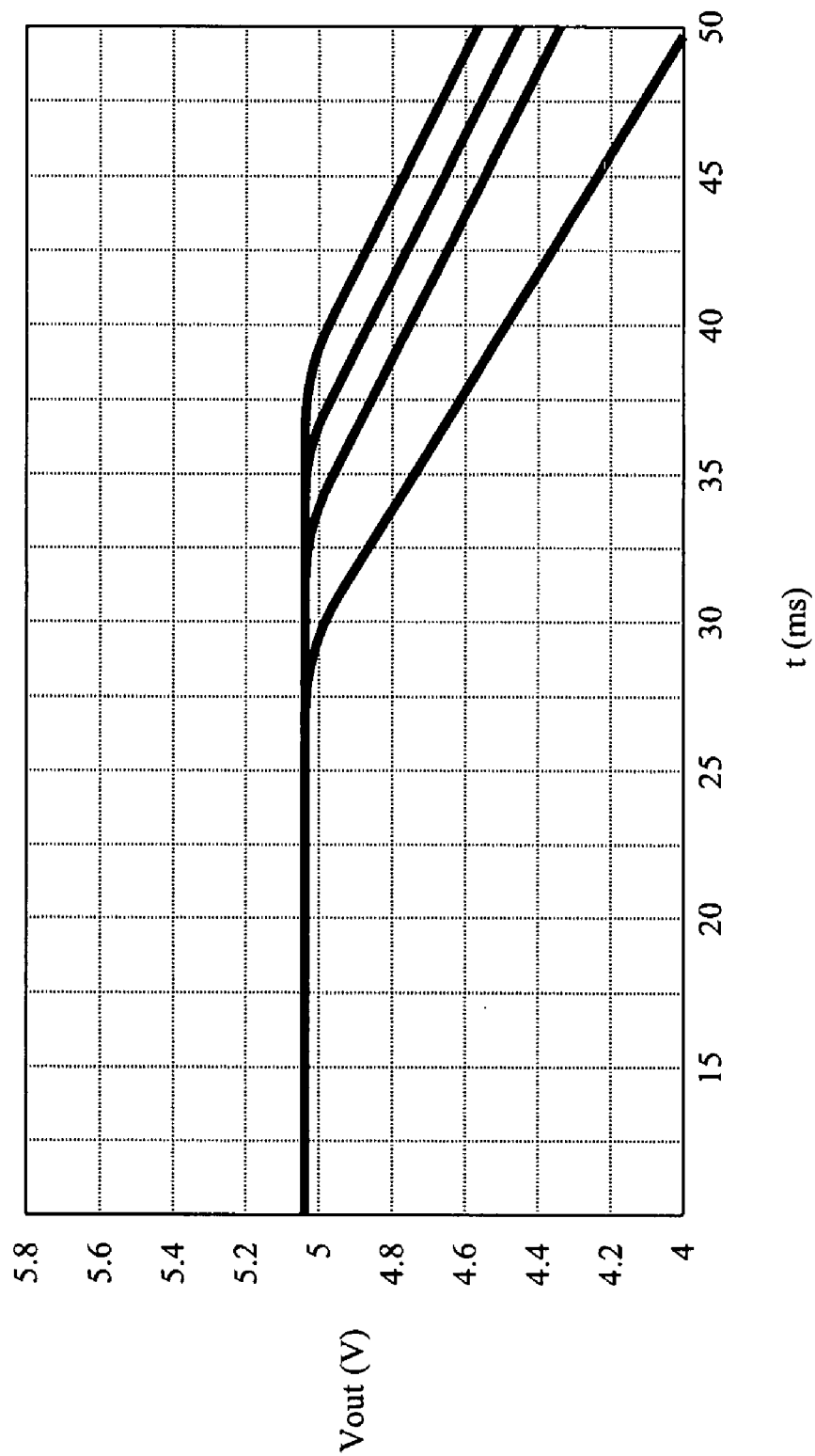
FIG. 15 shows a simulation result by using a constant current limit signal.
Figure 16:
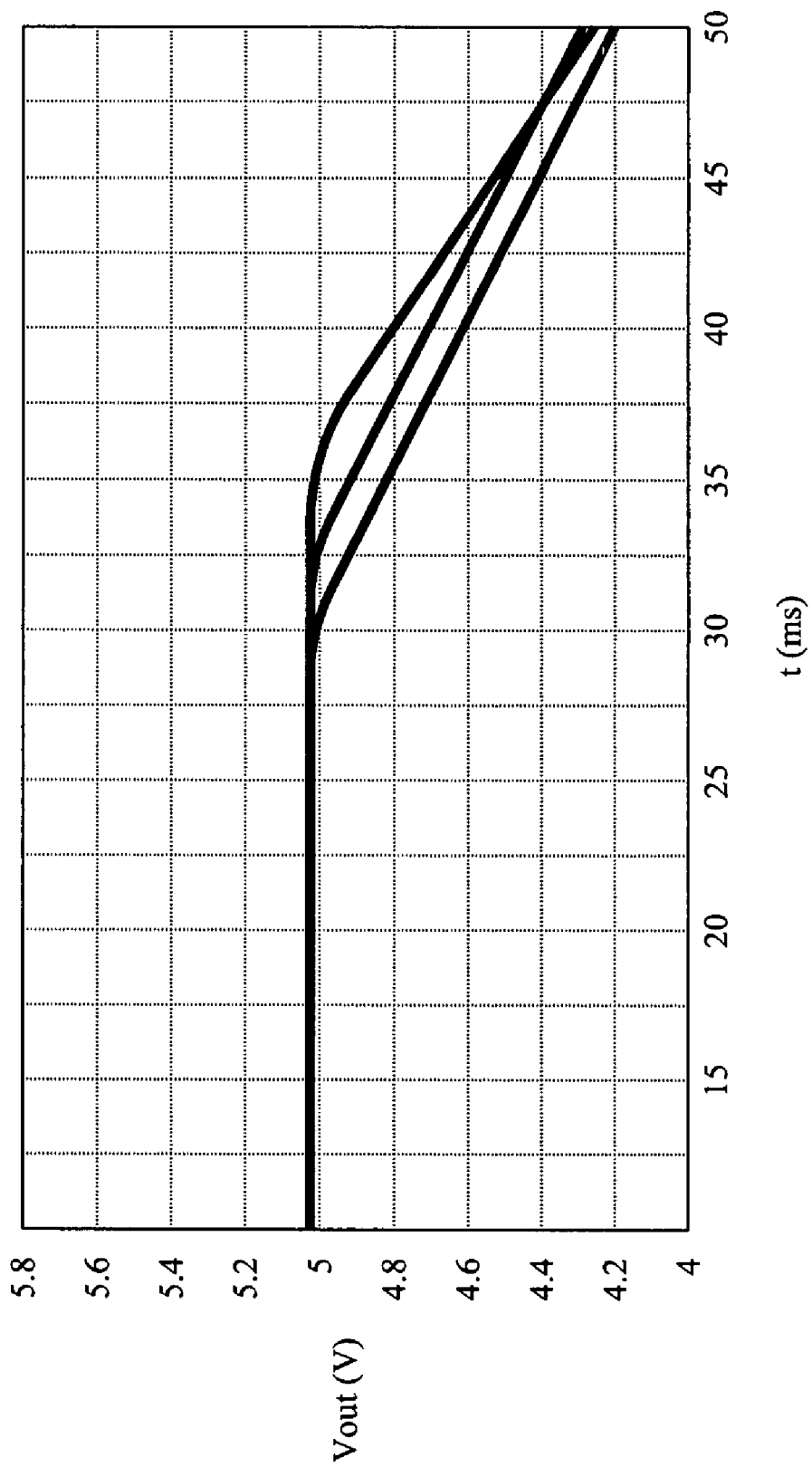
FIG. 16 shows a simulation result by using a linearly increasing current limit signal.
Figure 17:
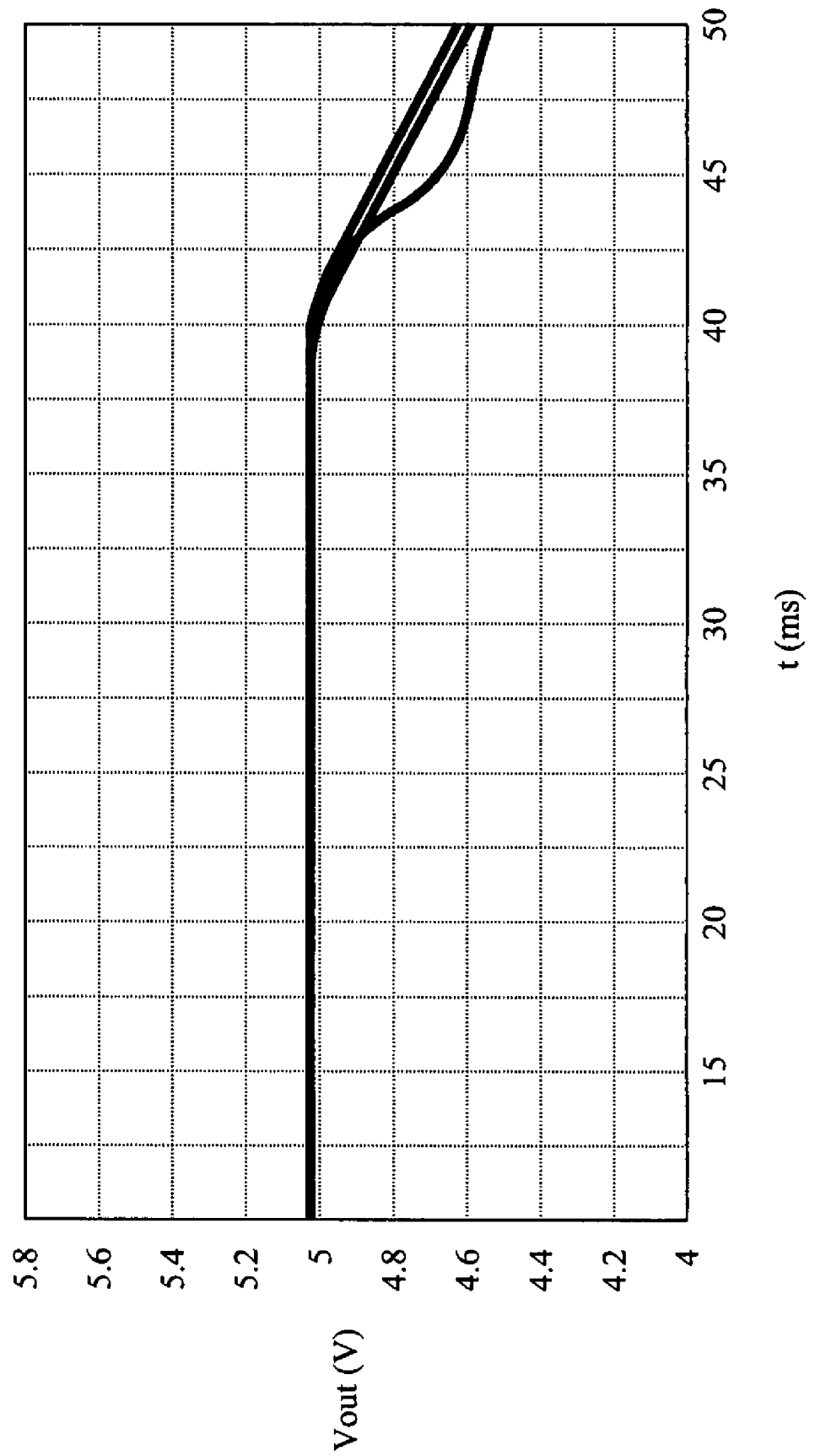
FIG. 17 shows a simulation result by using a current limit signal having a multi-slope waveform according to the present invention.

FIG. 15 shows the result by using a constant current limit signal with the conventional method, FIG. 16 shows the result by using a linearly increasing current limit signal with the Yang method, and FIG. 17 shows the result by using a dual-slope current limit signal generated by the circuit of FIG. 10. From FIGS. 15-17, it is obvious that, for obtaining a same output power Pout, the constant power limits derived from the constant current limit signal are very diverse, the constant power limits derived from the Yang method are closer than those derived from the constant current limit signal, and the constant power limits derived from the present invention are almost at a same point. Hence, the present invention successfully provides improved stabilization to the output power of the flyback converter 100.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. An apparatus for output power limit for a switching mode power converter to convert an input voltage to an output voltage by switching a power switch to have a switched current flowing therethrough, the switched current having a maximum value being a function of a duty cycle of the power switch when the power converter operates at a constant output power condition, the apparatus comprising:
   a current limit signal generator for providing a current limit signal varying nonlinearly with respect to the duty cycle of the power switch to thereby generate a waveform having multiple rising slopes; and a comparator for comparing the current limit signal with a switched current dependent signal to turn off the power switch when the switched current dependent signal is not lower than the current limit signal.

2. An apparatus for output power limit for a switching mode power converter to convert an input voltage to an output voltage by switching a power switch to have a switched current flowing therethrough, the switched current having a maximum value being a function of a duty cycle of the power switch when the power converter operates at a constant output power condition, the apparatus comprising:
 a current limit signal generator for providing a current limit signal varying nonlinearly with respect to the duty cycle of the power switch to thereby generate a waveform having multiple rising slopes, the current limit signal generator including:
  (a) resistor;
  (b) a voltage controlled current source having an input coupled to for providing a variable current under control of a variable voltage which is dependent on the duty cycle for providing a variable current corresponding to the variable voltage; and
  (c) a current mirror for mirroring the variable current to generate a mirror current to flow through the resistor so as to generate a voltage across the resistor defining the current limit signal; and
 a comparator for comparing the current limit signal with a switched current dependent signal to turn off the power switch when the switched current dependent signal is not lower than the current limit signal.

3. An apparatus for output power limit for a switching mode power converter to convert an input voltage to an output voltage by switching a power switch to have a switched current flowing therethrough, the switched current having a maximum value being a function of a duty cycle of the power switch when the power converter operates at a constant output power condition, the apparatus comprising:
 a current limit signal generator for providing a current limit signal having a multislope waveform according to the function, the current limit signal generator including:
  an adder having a first input connected with a first voltage and at least one second input each connected with a second voltage through a switch, for combining all the voltages on the first input and the at least one second input to generate a third voltage, the first voltage and the at least one second voltage dependent on the function;
  a capacitor;
  a voltage-to-current converter for converting the third voltage to a charging current to charge the capacitor so as to generate a fourth voltage; and
  a third voltage source for providing a fifth voltage to shift the fourth voltage so as to generate the current limit signal; and
 a comparator for comparing the current limit signal with a switched current dependent signal so as to turn off the power switch when the switched current dependent signal is not lower than the current limit signal.

4. An apparatus for output power limit for a switching mode power converter to convert an input voltage to an output voltage by switching a power switch to have a switched current flowing therethrough, the switched current having a maximum value being a function of a duty cycle of the power switch when the power converter operates at a constant output power condition, the apparatus comprising:
 a current limit signal generator for providing a current limit signal varying nonlinearly with respect to the duty cycle of the power switch to thereby generate a waveform having multiple rising slopes, the current limit signal generator including a capacitor for determining the current limit signal in response to a variable charging; and
 a comparator for comparing the current limit signal with a switched current dependent signal to turn off the power switch when the switched current dependent signal is not lower than the current limit signal,
 wherein when the variable charging current changes, the slope of the current limit signal changes correspondingly, and the variable charging current is dependent on the function.

5. A method for output power limit for a switching mode power converter to convert an input voltage to an output voltage by switching a power switch to have a switched current flowing therethrough, the switched current having a maximum value being a function of a duty cycle of the power switch when the power converter operates at a constant output power condition, the method comprising the steps of:
 generating a current limit signal varying nonlinearly with respect to the duty cycle of the power switch to thereby generate a waveform having multiple rising slopes; and
 comparing the current limit signal with a switched current dependent signal to turn off the power switch when the switched current dependent signal is not lower than the current limit signal.

6. The method of claim 5, wherein the step of generating a current limit signal comprises the steps of:
 determining a plurality of first voltages according to the function;
 sequentially accumulating the plurality of first voltages to generate a second voltage that varies with time; and
 generating the current limit signal from the second voltage, such that the current limit signal has a slope that varies with the second voltage.

7. The method of claim 5, wherein the step of generating a current limit signal comprises the step of determining a variable charging current according to the function to charge a capacitor to determine the current limit signal, wherein when the variable charging current changes, the slope of the current limit signal changes correspondingly, and the variable charging current is dependent on the duty cycle of the power switch.

* * * * *